US012175155B2

(12) United States Patent
Chang et al.

(10) Patent No.: US 12,175,155 B2
(45) Date of Patent: Dec. 24, 2024

(54) WIRELESS TRANSMISSION SYSTEM AND METHOD THEREOF

(71) Applicant: Lanto Electronic Limited, Kunshan (CN)

(72) Inventors: Chih-Hsiung Chang, Taipei (TW); Chia-Ching Lin, Taipei (TW)

(73) Assignee: LANTO ELECTRONIC LIMITED, Kunshan (CN)

( * ) Notice: Subject to any disclaimer, the term of this patent is extended or adjusted under 35 U.S.C. 154(b) by 0 days.

(21) Appl. No.: 18/224,646

(22) Filed: Jul. 21, 2023

(65) Prior Publication Data

US 2024/0143264 A1 May 2, 2024

(30) Foreign Application Priority Data

Oct. 26, 2022 (CN) .......................... 202211316124.1

(51) Int. Cl.
*G06F 3/14* (2006.01)
*H04W 76/10* (2018.01)

(52) U.S. Cl.
CPC .......... *G06F 3/1454* (2013.01); *H04W 76/10* (2018.02)

(58) Field of Classification Search
CPC ..... G06F 1/1632; G06F 3/1454; H04W 76/10
See application file for complete search history.

(56) References Cited

U.S. PATENT DOCUMENTS

| 9,934,168 | B2 | 4/2018 | Griffin | |
|---|---|---|---|---|
| 2014/0016037 | A1* | 1/2014 | Goldberg | H04N 5/265 348/600 |
| 2014/0152235 | A1* | 6/2014 | Huang | G06F 1/1632 320/107 |
| 2016/0278739 | A1* | 9/2016 | Pelissier | G16H 30/20 |
| 2017/0017454 | A1* | 1/2017 | Kim | G06F 3/04845 |

FOREIGN PATENT DOCUMENTS

| CN | 102333152 A | 1/2012 |
|---|---|---|
| CN | 105335125 A | 2/2016 |
| CN | 105379315 A | 3/2016 |

(Continued)

*Primary Examiner* — Hang Lin
(74) *Attorney, Agent, or Firm* — Birch, Stewart, Kolasch & Birch, LLP (57) ABSTRACT

Disclosed is a wireless transmission system, including a mobile electronic device with first screen information, a computer with second screen information, and a docking station coupled to the computer. When accommodating the mobile electronic device, the docking station transmits an electrical signal to the mobile electronic device, wherein the computer confirms that the mobile electronic device is located on the docking station according to a Bluetooth Low Energy signal sent by the mobile electronic device, the computer transmits Wi-Fi service set identification information to the mobile electronic device through a Bluetooth Low Energy protocol, the computer and the mobile electronic device are connected to the same Wi-Fi access point, and the mobile electronic device sends the first screen information back to the computer. Accordingly, the problem that the computer and the mobile electronic device cannot transmit data or screen information to each other through a transmission line is solved.

10 Claims, 10 Drawing Sheets

(56) References Cited

FOREIGN PATENT DOCUMENTS

| | | | |
|---|---|---|---|
| CN | 106688224 | A | 5/2017 |
| CN | 106951206 | A | 7/2017 |
| CN | 111405681 | A | 7/2020 |
| CN | 112771900 | A | 5/2021 |
| CN | 112888029 | A | 6/2021 |
| CN | 114040349 | A | 2/2022 |
| CN | 114356197 | A | 4/2022 |
| TW | 201237645 | A1 | 9/2012 |
| TW | 201325006 | A1 | 6/2013 |
| TW | 201631485 | A | 9/2016 |

\* cited by examiner

WIRELESS TRANSMISSION SYSTEM AND METHOD THEREOF

CROSS REFERENCE TO RELATED PRESENT DISCLOSURE

This application claims the priority benefit of Chinese Patent Application Serial Number 202211316124.1, filed on Oct. 26, 2022, the full disclosure of which is incorporated herein by reference.

BACKGROUND

Technical Field

The present disclosure relates to the technical field of wireless communication, and in particular to a wireless transmission system and a method thereof.

Related Art

In recent years, with the progress of semiconductor manufacturing process, the thickness of the notebook computer is getting thinner and thinner. Under this trend, there are fewer and fewer input/output interfaces, referred to as I/O interfaces, of the notebook computer, such as USB slots, which results in more and more docking stations with I/O interfaces in the market.

Even so, no matter whether the user uses a smartphone to search for data or browse the web sites, as long as the user wants to further edit these data or browse these websites using a notebook computer or a desktop computer, he must connect the notebook and the smartphone through a USB transmission line to display the data or website on the notebook computer, and further edit these data or browse the websites; or he first uses the smartphone to upload the data or the addresses of the web sites to the cloud, then uses the notebook computer or desktop computer to download the data or the addresses of the web sites from the cloud, and then edits the data or browse these websites on the notebook computer or desktop computer.

Moreover, the smartphone has become a recording device in daily life. As the image resolution becomes higher and higher, the size of image file becomes larger and larger, and how to transmit, save or share these videos becomes more and more important. How to wirelessly transmit these videos from the smartphone to the notebook computer or desktop computer becomes a problem to be solved when there is no transmission line to transmit these videos from the smartphone to the notebook computer or desktop computer.

Based on these considerations, how to wirelessly transmit these data, videos, or pictures from a smartphone to a notebook computer or a desktop computer is indeed a need for better solutions.

SUMMARY

Embodiments of the present disclosure provide a wireless transmission system and a method thereof, which can solve the problem that the computer and the mobile electronic device cannot transmit data or screen information to each other through a transmission line when the number of user-oriented input/output interfaces, such as USB slots, of the computer is gradually reduced, or even there is no input/output interfaces.

In order to solve the above-mentioned technical problems, the present disclosure can be implemented as follows.

A wireless transmission system is provided and includes a mobile electronic device having first screen information; a computer having second screen information; and a docking station coupled to the computer, and transmitting an electrical signal to the mobile electronic device when accommodating the mobile electronic device, wherein the computer confirms that the mobile electronic device is located on the docking station according to a Bluetooth Low Energy signal sent by the mobile electronic device; the computer transmits Wi-Fi service set identification information to the mobile electronic device through a Bluetooth Low Energy protocol; the computer and the mobile electronic device are connected to the same Wi-Fi access point; and the mobile electronic device sends the first screen information back to the computer.

Preferably, the mobile electronic device further includes a display coupled to the docking station and displaying the second screen information and the first screen information located on the second screen information.

Preferably, the computer displays the first screen information and the second screen information; and when a file located on the second screen information is moved to a coordinate position on the first screen information, and the computer recognizes that the file moves from a coordinate position of the second screen information to the coordinate position of the first screen information, the computer transmits the file to the mobile electronic device through a file transmission program.

Preferably, the computer displays the first screen information and the second screen information; and when a file located on the first screen information is moved to a coordinate position on the second screen information, the mobile electronic device transmits the file to the computer through a file transmission program.

Preferably, the mobile electronic device further includes a camera and a first application program; the first application program is located on the first screen information for reading preview data collected by the camera, and transmitting the preview data to the computer; and the computer further includes a second application program for displaying the preview data.

In order to solve the above-mentioned technical problems, the present disclosure can also be implemented as follows.

A wireless transmission method is provided, and is suitable for transmitting data between a computer and a mobile electronic device through a docking station. The wireless transmission method includes the following steps: detecting, by the docking station, a Bluetooth Low Energy signal sent by the mobile electronic device; confirming, by the computer, that the mobile electronic device is located on the docking station according to the Bluetooth Low Energy signal sent by the mobile electronic device; transmitting, by the computer, Wi-Fi service set identification information to the mobile electronic device through a Bluetooth Low Energy protocol; connecting, by the mobile electronic device, to a Wi-Fi access point that the computer logs in to, after receiving the Wi-Fi service set identification information; and sending, by the mobile electronic device, first screen information displayed by itself back to the computer.

Preferably, the computer displays second screen information and the first screen information located on the second screen information.

Preferably, when the computer recognizes that a file moves from a coordinate position of the second screen information to a coordinate position of the first screen information, the computer transmits the file to the mobile electronic device through a file transmission program.

Preferably, when the computer recognizes that a file moves from a coordinate position of the first screen information to a coordinate position of the second screen information, the mobile electronic device transmits the file to the computer through a file transmission program Preferably, the mobile electronic device reads preview data collected from a camera thereof, and transmits the preview data to the computer; and the computer displays the preview data on the second screen information.

According to the above wireless transmission system and method thereof, by connecting the computer and the mobile electronic device through the docking station, the computer and the mobile electronic device can wirelessly transmit data or screen information to each other.

BRIEF DESCRIPTION OF THE DRAWINGS

Accompanying drawings described herein are intended to provide a further understanding of the present disclosure and form a part of the present disclosure, and exemplary embodiments of the present disclosure and descriptions thereof are intended to explain the present disclosure but are not intended to unduly limit the present disclosure. In the drawings.

DETAILED DESCRIPTION OF THE EMBODIMENTS

The embodiments of the present disclosure will be described below in conjunction with the relevant drawings. In the figures, the same reference numbers refer to the same or similar components or method flows.

It must be understood that the words "including", "comprising" and the like used in this specification are used to indicate the existence of specific technical features, values, method steps, work processes, elements and/or components. However, it does not exclude that more technical features, values, method steps, work processes, elements, components, or any combination of the above can be added.

It must be understood that when an element is described as being "connected" or "coupled" to another element, it may be directly connected or coupled to another element, and intermediate elements therebetween may be present. In contrast, when an element is described as being "directly connected" or "directly coupled" to another element, there is no intervening element therebetween.

Figure 1:
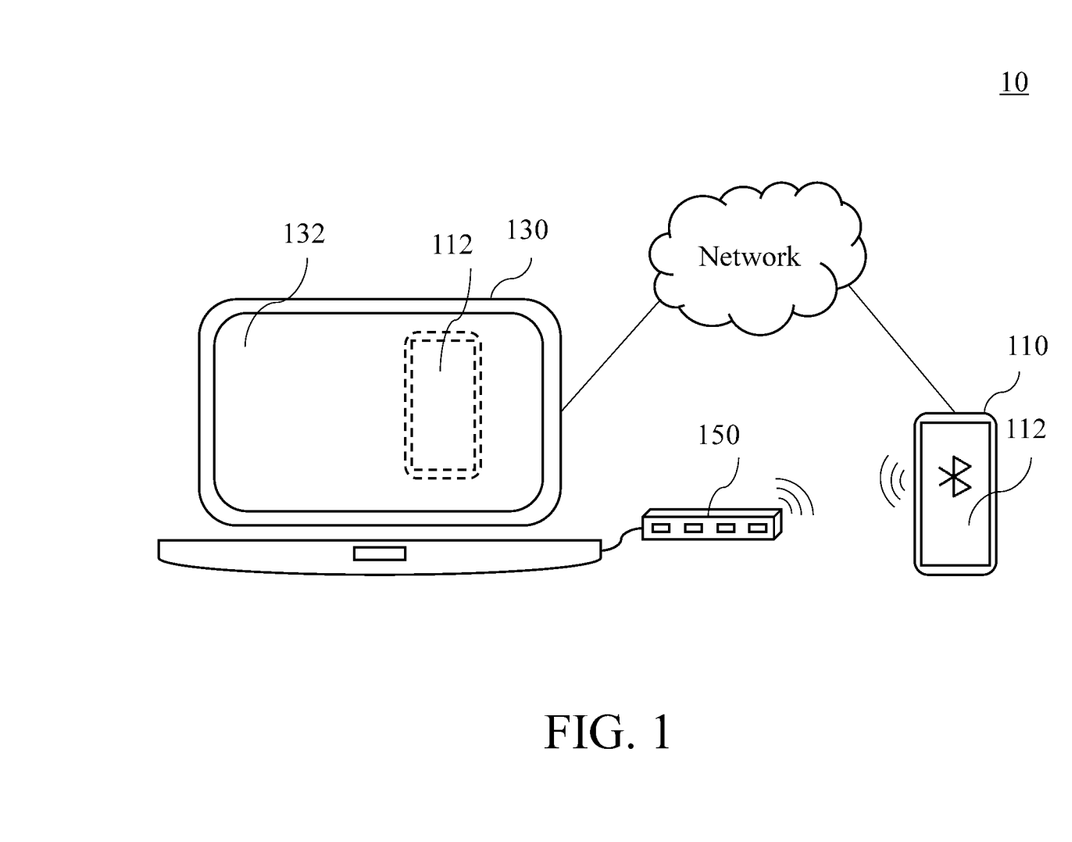
FIG. 1 is a schematic diagram of a usage scenario of a wireless transmission system according to an embodiment of the present disclosure.

Regarding the embodiment of the present disclosure, please refer to FIG. 1, which includes a wireless transmission system 10, which solves the problem that the computer 130 and the mobile electronic device 110 cannot transmit more than one data or picture through a transmission line.

Please refer to FIG. 1, wherein the wireless transmission system 10 comprises a mobile electronic device 110, a computer 130 and a docking station 150. The mobile electronic device has first screen information 112. The computer has second screen information 132. The docking station 150 is coupled to the computer 130, and when accommodating the mobile electronic device 110, the docking station 150 transmits an electrical signal to the mobile electronic device 110, and the transmission of the electrical signal includes charging the mobile electronic device 110 or transmitting data to the mobile electronic device 110, wherein the computer 130 confirms that the mobile electronic device 110 is located on the docking station 150 according to a Bluetooth Low Energy signal sent by the mobile electronic device 110; the computer 130 transmits Wi-Fi service set identification information to the mobile electronic device 110 through a Bluetooth Low Energy protocol; the computer 130 and the mobile electronic device 110 are connected to the same Wi-Fi access point; and the mobile electronic device 110 sends the first screen information 112 back to the computer 130. Therefore, by wirelessly connecting the computer 130 and the mobile electronic device 110 through the docking station 150, the computer 130 and the mobile electronic device 110 can wirelessly transmit data or pictures to each other.

In this embodiment, the computer 130 detects the received signal strength indication (RSSI) of a Bluetooth Low Energy signal sent by the mobile electronic device 110 using the Bluetooth protocol. That is to say, the mobile electronic device 110 is in the broadcast state and can send broadcast packets at predetermined broadcast intervals, and the docking station 150 has the Bluetooth communication function, so it can continuously perform a scan to obtain the broadcast packet(s). If the docking station 150 obtains the broadcast packet(s), the computer 130 can further determine the RSSI of the Bluetooth Low Energy signal sent by the mobile electronic device 110. If the RSSI of the mobile electronic device 110 is less than a preset threshold, the computer 130 confirms that the mobile electronic device 110 is located on the docking station. Afterwards, the computer 130 transmits the Wi-Fi service set identifier (SSID) and password of the currently connected network to the mobile electronic device 110 through the Bluetooth transmission protocol. After receiving the Wi-Fi SSID and password, the mobile electronic device 110 can connect to the same Wi-Fi access point as the computer 130 logs in to. At this time, the preset application program or software of the mobile electronic device 110 can be executed to send the first screen information 112 back to the computer 130. Then, the computer 130 displays the first screen information 112 and the second screen information 132, wherein the first screen information 112 is located on the second screen information 132.

In this embodiment, if the docking station 150 obtains the broadcast packet(s), the computer 130 can further send a scanning request to the mobile electronic device 110 to make the mobile electronic device 110 broadcast the broadcast packet(s) of scanning response. The computer 130 can also scan the broadcast packet(s) and the broadcast packet(s) of scanning response. In this embodiment, after the computer 130 sends a scanning request to the mobile electronic device 110, the mobile electronic device 110 can further execute and pass a white list check program, so that the mobile electronic device 110 broadcasts the broadcast packet(s) of the scanning response. In this embodiment, the computer 130 scans the broadcast packet(s) and the broadcast packet (s) of scanning response, and can further execute and pass a white list check program.

In this embodiment, the mobile electronic device 110 may be a smartphone, a tablet computer, or a smart watch. The computer 130 may be a desktop computer, a notebook computer, or a server. The mobile electronic device 110 and the computer 130 enable two or more electronic devices to perform communication through communication protocols such as Bluetooth, Bluetooth Low Energy, Beacon, Zigbee, and Near-Field Communication (NFC), and can also connect to the network through a Wi-Fi access point. The docking station 150 can be a dock charger with I/O interfaces, a wireless charging tray or a car charger, wherein the I/O interfaces includes a USB interface, a TYPE-C interface, a Micro USB interface, and a Lightning interface.

In addition, the mobile electronic device 110 can be equipped with operating systems such as iOS, Android, and Hongmeng, so that the touch screen of the mobile electronic device 110 displays screens that can be operated by hand or stylus, such as the first screen information, and the icons of multiple application programs or software installed in the mobile electronic device 110 are also displayed on the operable screen. The computer 130 can be equipped with operating systems such as Windows, Linux, MacOS, and LiteOS, so that the screen (or touch screen) of the computer 130 displays screens that can be operated by the mouse, the pen, the touch panel, the keyboard, such as the second screen information, and the icons of multiple application programs or software installed in the computer 130 are also displayed on the operable screen.

Figure 2:
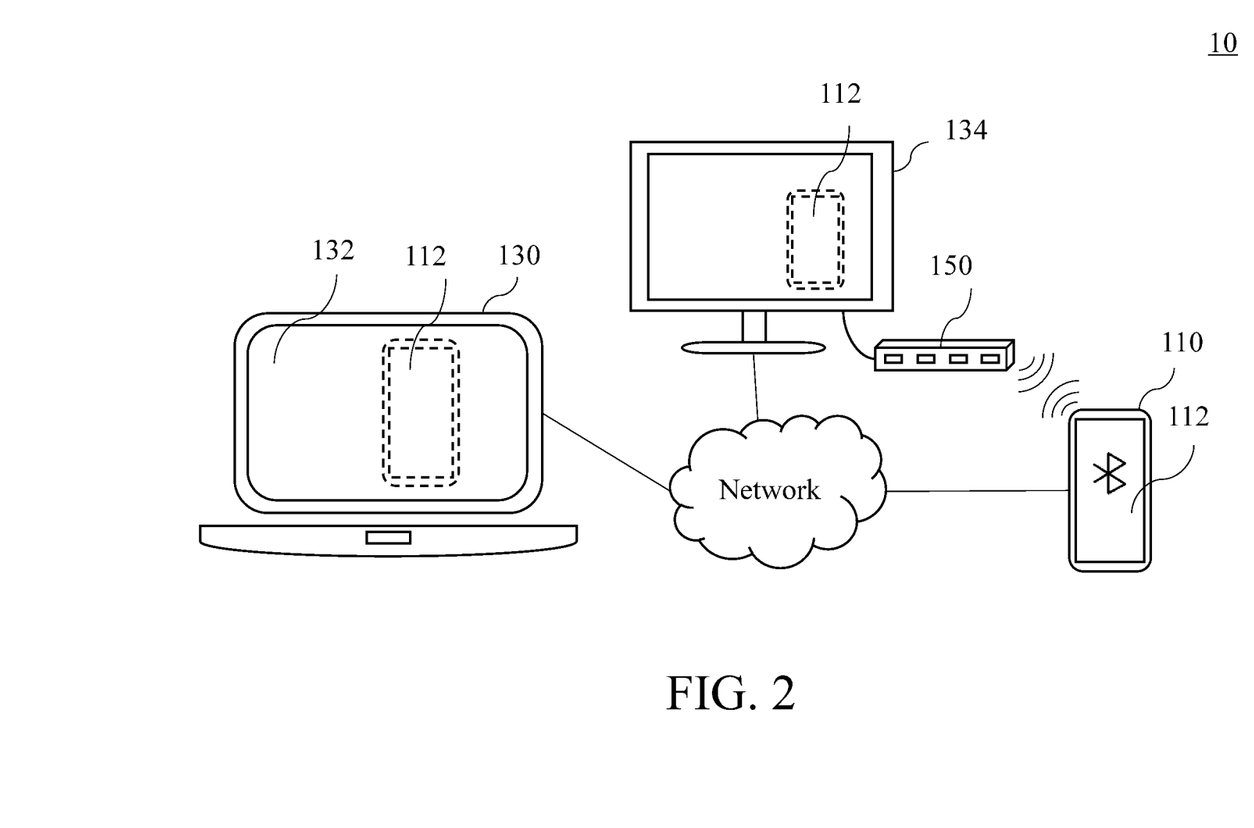
FIG. 2 is a schematic diagram of a usage scenario of a wireless transmission system according to another embodiment of the present disclosure.

In this embodiment, the wireless transmission system 10 comprises a display 134, as shown in FIG. 2. The display 134 is coupled to the docking station 150. The application programs or software installed in the mobile electronic device 110 can be executed to send the first screen information 112 back to the computer 130. The computer 130 transmits the first screen information 112 and the second screen information 132 to the display 134 to display the first screen information 112 included in the second screen information 132.

Figure 3:
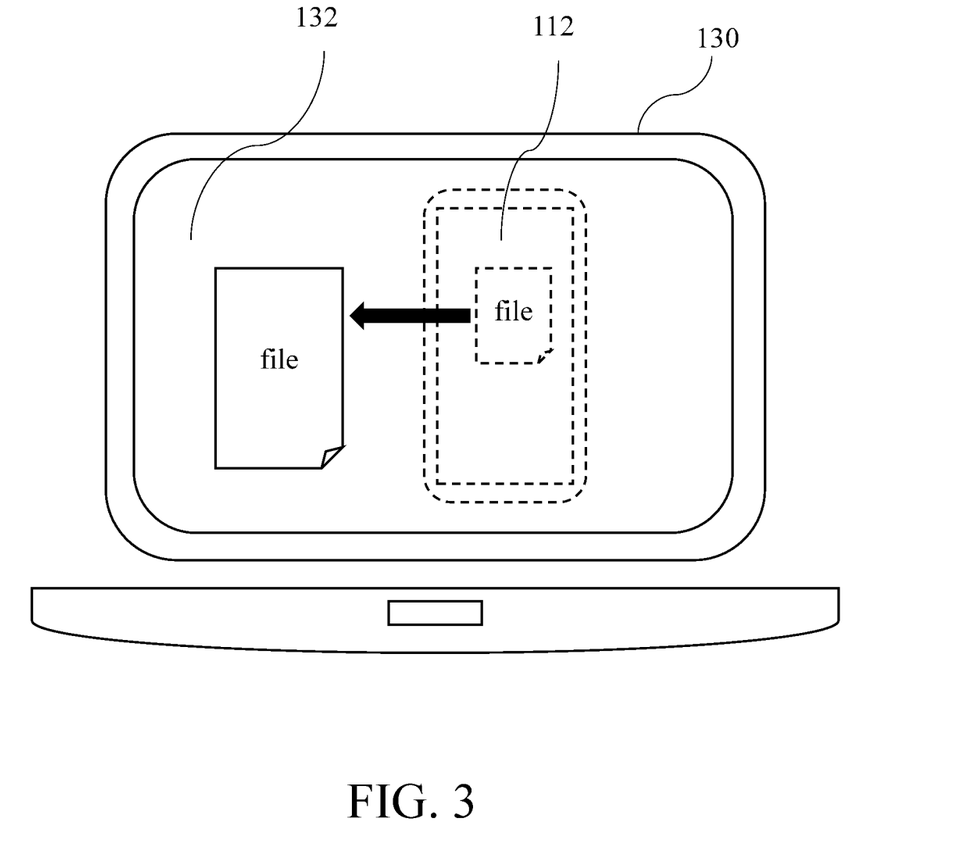
FIG. 3 is a schematic diagram of an application of a wireless transmission system according to another embodiment of the present disclosure.

To illustrate still embodiment of the present disclosure, please refer to FIG. 3, which further comprises moving a file located on the second screen information 132 to a preset position of the first screen information 112. Specifically, the computer 130 has the first screen information 112 and the second screen information 132. When the file is dragged by the mouse to any coordinate on the first screen information 112, the computer 130 transmits the file to the mobile electronic device 110 through a file transmission program such as a SOCKET program. The mobile electronic device 110 waits for the file transmitted through the SOCKET program, and after the mobile electronic device 110 receives the file, the application program or software installed in the mobile electronic device 110 can be executed to place the file in a preset storage location.

Figure 4:
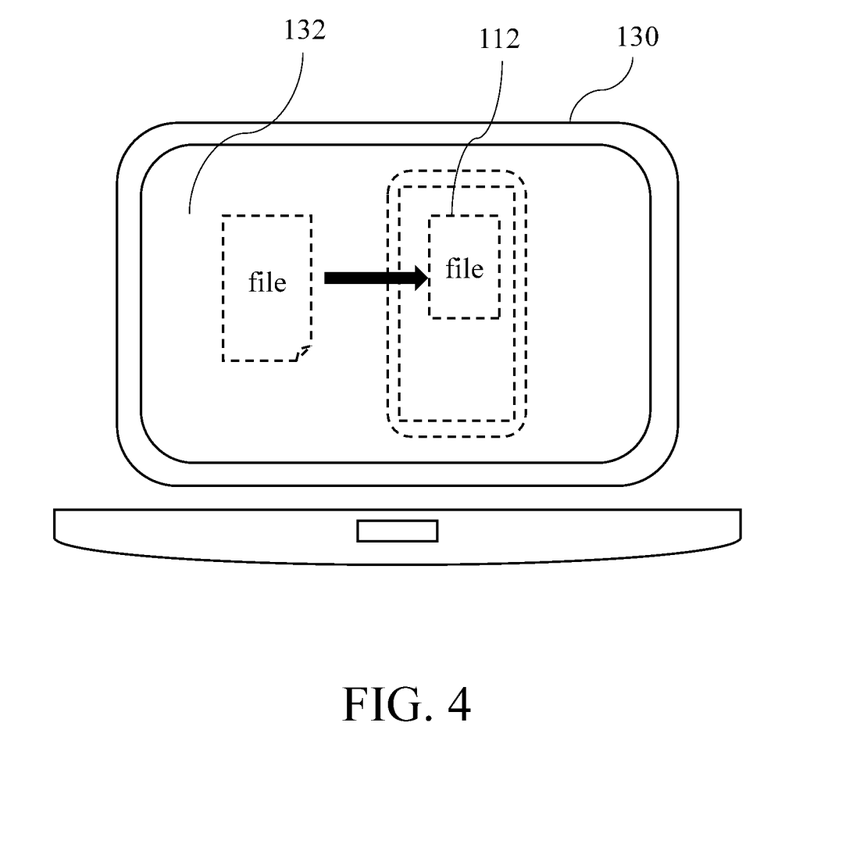
FIG. 4 is a schematic diagram of an application of a wireless transmission system according to another embodiment of the present disclosure.

To illustrate yet another embodiment of the present disclosure, please refer to FIG. 4, which further includes moving a file located on the first screen information 112 to a preset position of the second screen information 132. Specifically, the computer 130 has the first screen information 112 and the second screen information 132. The coordinate of the mouse is located on the first screen information 112, and the file located on the first screen information 112 is dragged by the mouse to any coordinate in the second screen information 132. Afterwards, the mobile electronic device 110 transmits the file to the computer 130 through a file transmission program such as a SOCKET program. The computer 130 waits for the file transmitted through a SOCKET program, and the application program or software installed in the computer 130 can be executed to place the file in a preset storage location after the computer 130 receives the file.

Figure 5:
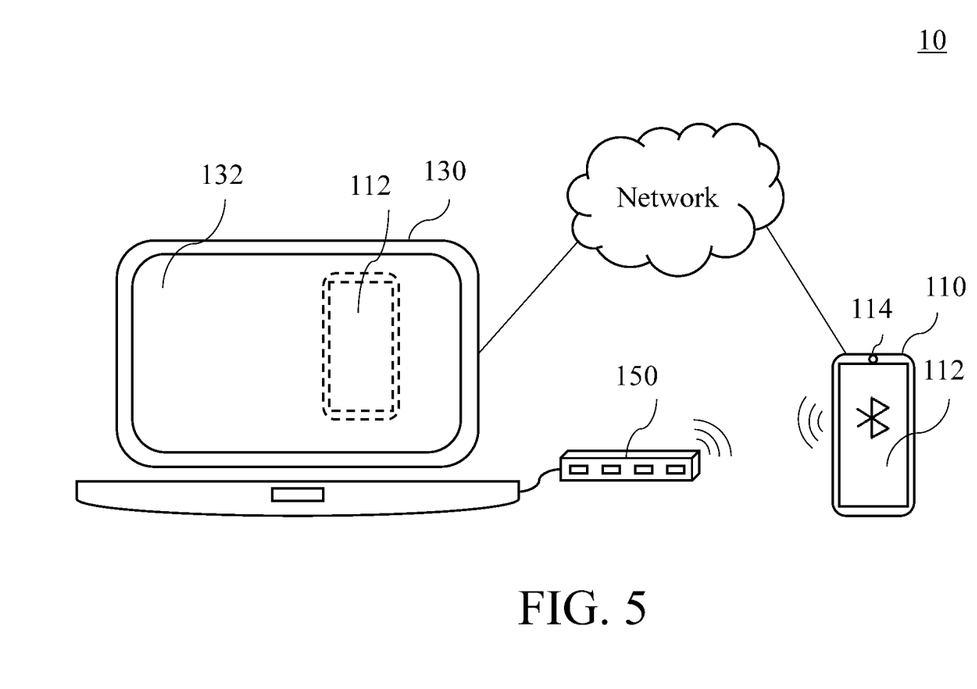
FIG. 5 is a schematic diagram of an application of a wireless transmission system according to another embodiment of the present disclosure.

To illustrate still another specific application of the present disclosure, please refer to FIG. 5. The wireless transmission system 10 is used in a situation where a user conducts a video conference, and the mobile electronic device 110 has a camera 114 to capture or record images or videos from different angles. Specifically, the preset application program or software installed in the mobile electronic device 110 can be executed to activate the camera 114. When the camera 114 is activated, the preset application program or software can be executed to simultaneously read the preview data obtained by the camera 114 and compress the preview data, briefly referred to as compressed data, so that the compressed data can be transmitted to the computer 130 through a file transmission program such as a SOCKET program. The computer 130 further decompresses the compressed data, and uses the preset virtual web camera driver to read the preview data. Thereafter, the application program or software installed in the computer 130 can be executed to display the preview data.

In yet another specific application of the present disclosure, the wireless transmission system 10 can further be applied to online teaching or testing for students, the mobile electronic device 110 shoots or records towards the answer paper, and the students can still continue to watch the second screen information 132 of the computer 130, which can achieve the technical efficacy that when the students conduct online teaching or testing, it is ensured that the students complete the testing alone instead of using books, communication software or Internet to find the answers to the testing.

Figure 6:
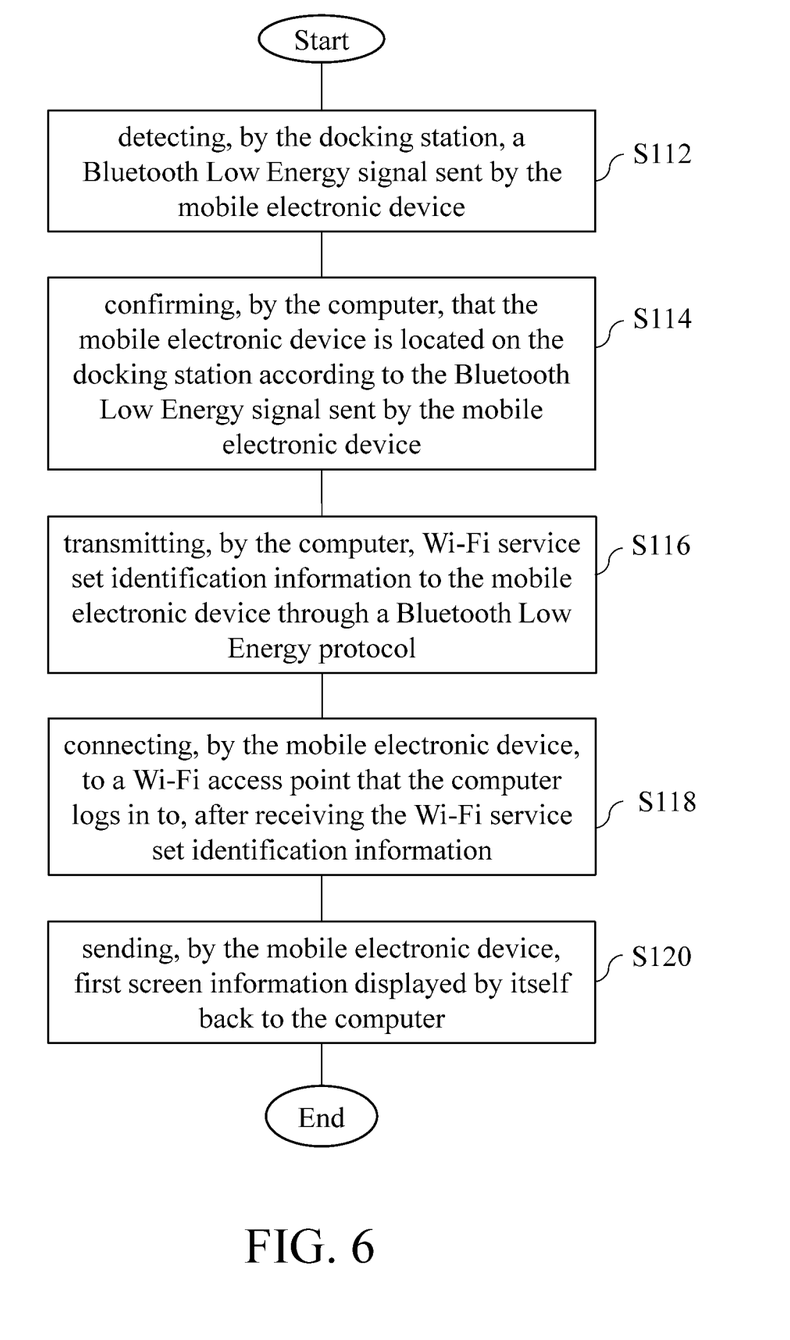
FIG. 6 is schematic flow chart of a wireless transmission method according to an embodiment of the present disclosure.

To illustrate another embodiment of the present disclosure, please refer to FIG. 6, which includes a wireless transmission method suitable for transmitting data between the computer 130 and the mobile electronic device 110 through the docking station 150. The wireless transmission method comprises the following steps:

Step S112: detecting, by the docking station, a Bluetooth Low Energy signal sent by the mobile electronic device;

Step S114: confirming, by the computer, that the mobile electronic device is located on the docking station according to the Bluetooth Low Energy signal sent by the mobile electronic device;

Step S116: transmitting, by the computer, Wi-Fi service set identification information to the mobile electronic device through a Bluetooth Low Energy protocol;

Step S118: connecting, by the mobile electronic device, to a Wi-Fi access point that the computer logs in to, after receiving the Wi-Fi service set identification information; and Step S120: sending, by the mobile electronic device, first screen information displayed by itself back to the computer.

Figure 7:
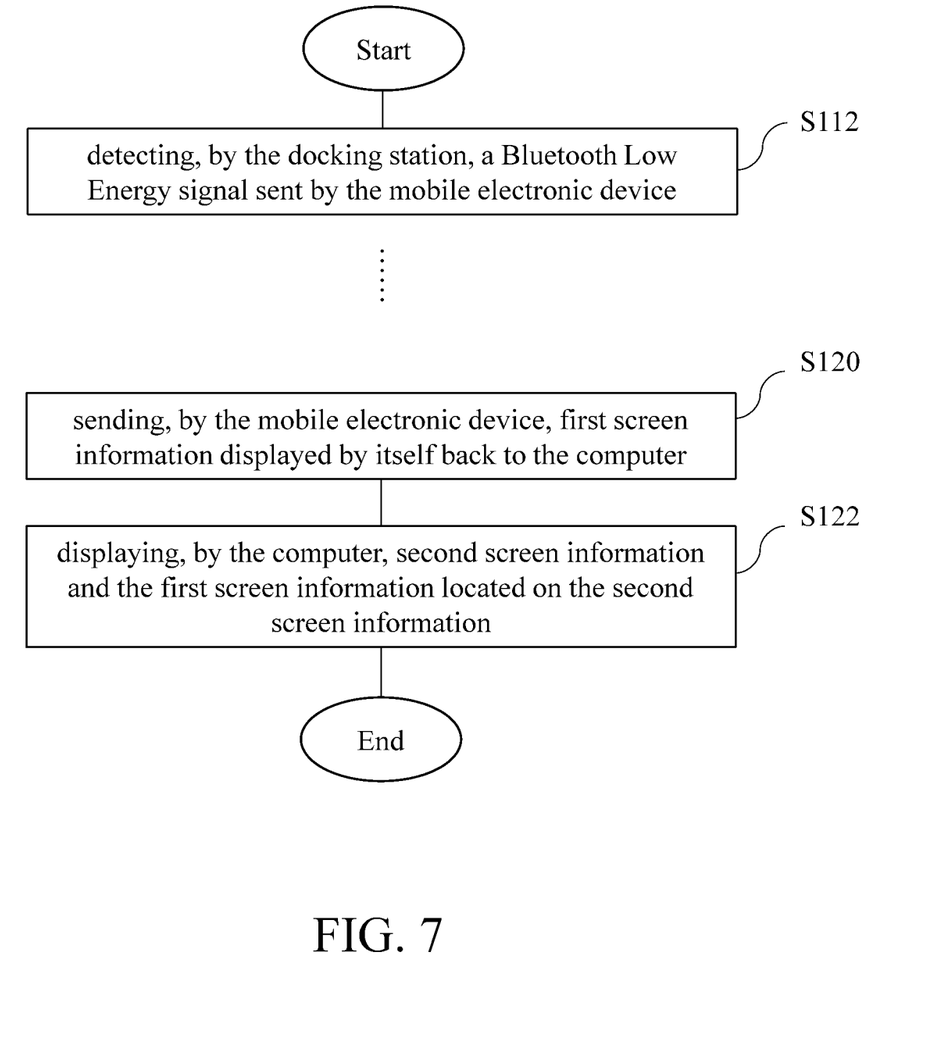
FIG. 7 is a schematic flow chart of a wireless transmission method according to another embodiment of the present disclosure.

In this embodiment, the wireless transmission method further comprises step S122: displaying, by the computer, second screen information and the first screen information located on the second screen information.

Figure 8:
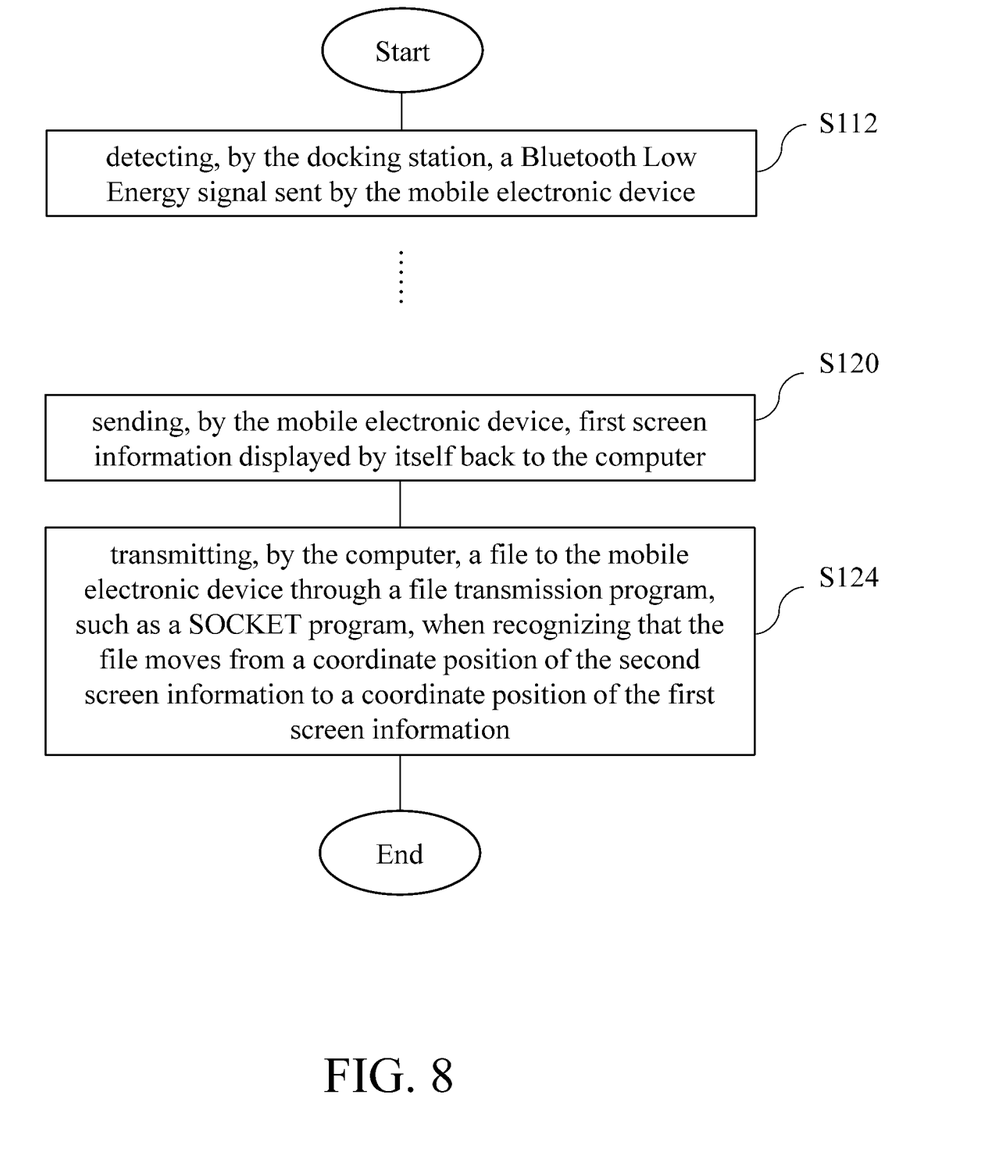
FIG. 8 is a schematic flow chart of a wireless transmission method according to another embodiment of the present disclosure.

In this embodiment, the wireless transmission method further comprises step S124: transmitting, by the computer, a file to the mobile electronic device through a file transmission program, such as a SOCKET program, when recognizing that the file moves from a coordinate position of the second screen information to a coordinate position of the first screen information.

Figure 9:
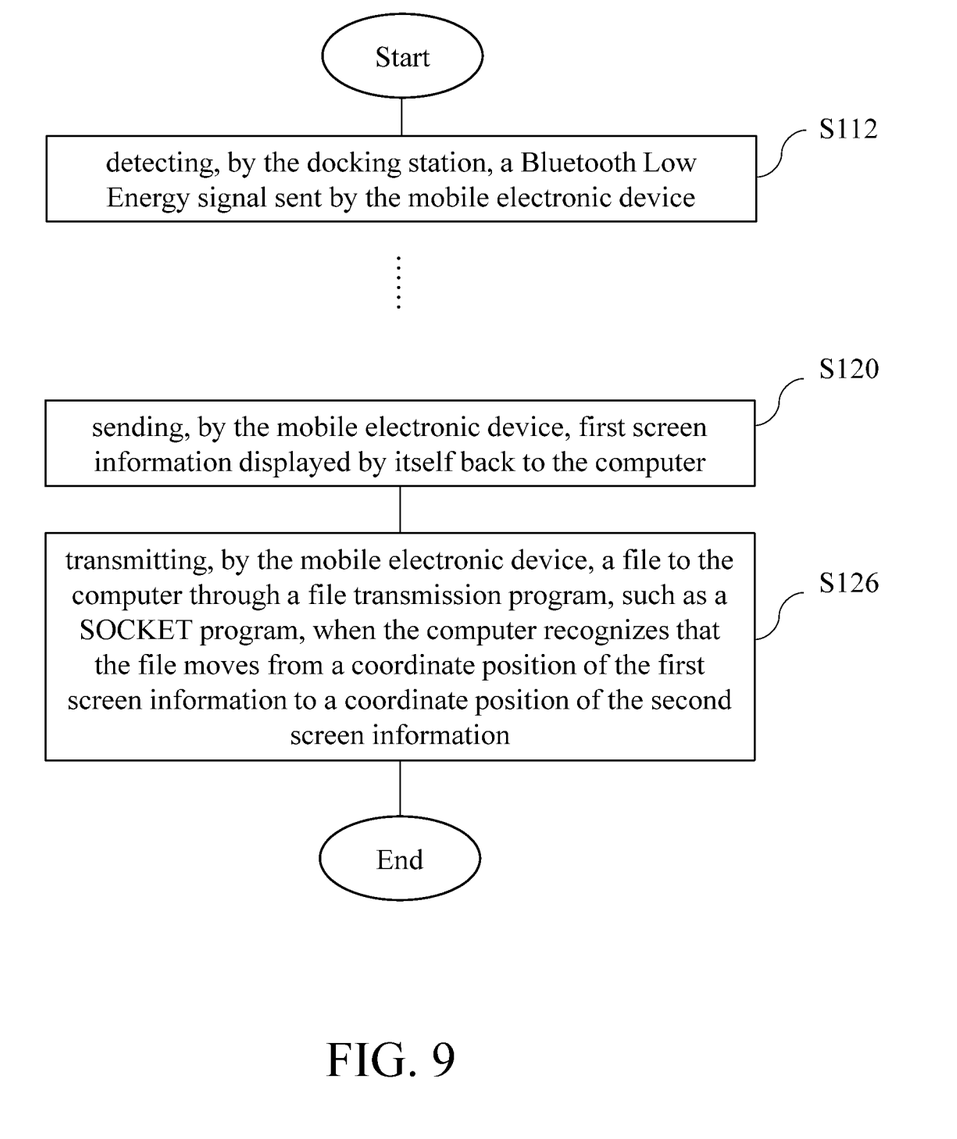
FIG. 9 is a schematic flow chart of a wireless transmission method according to another embodiment of the present disclosure.

In this embodiment, the wireless transmission method further comprises step S126: transmitting, by the mobile electronic device, a file to the computer through a file transmission program, such as a SOCKET program, when the computer recognizes that the file moves from a coordinate position of the first screen information to a coordinate position of the second screen information.

Figure 10:
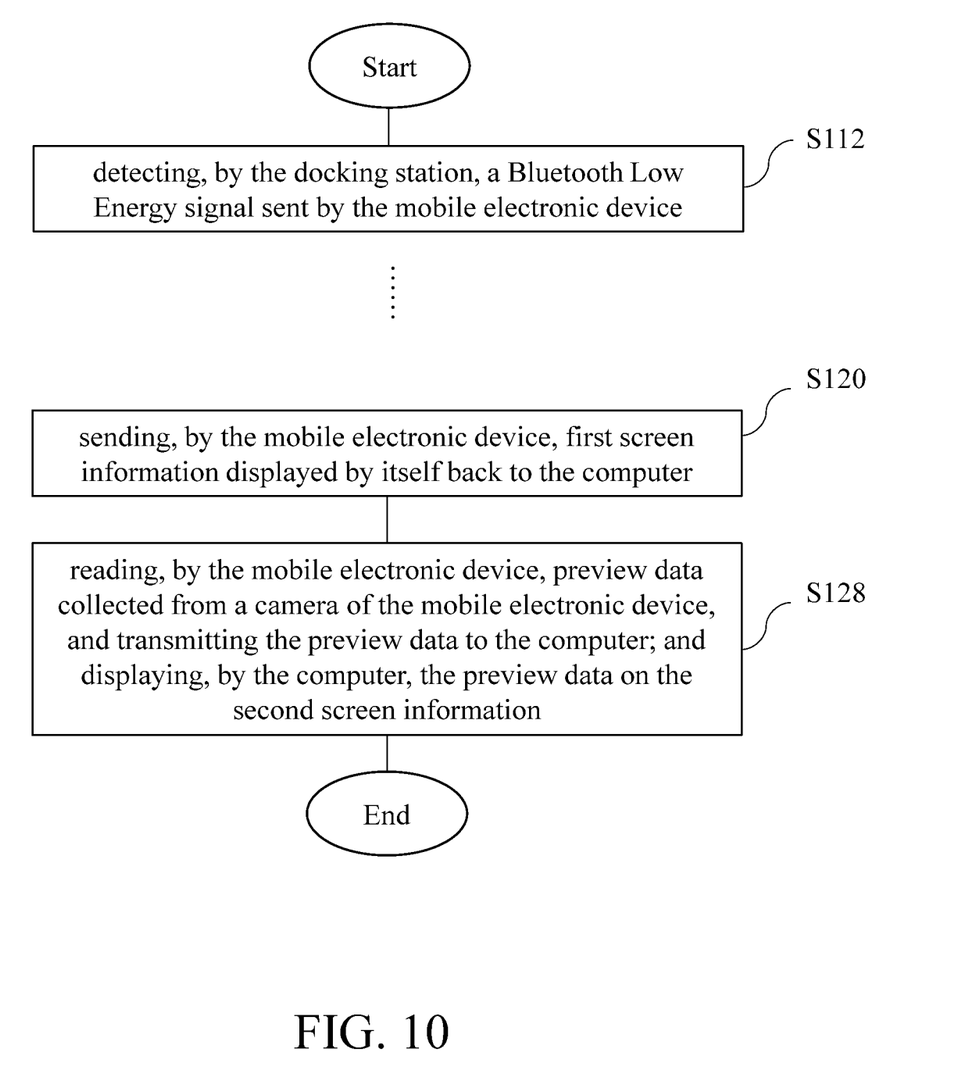
FIG. 10 is a schematic flow chart of a wireless transmission method according to another embodiment of the present disclosure.

In this embodiment, the wireless transmission method further comprises step S128: reading, by the mobile electronic device, preview data collected from a camera of the mobile electronic device, and transmitting the preview data to the computer; and displaying, by the computer, the preview data on the second screen information.

In summary, the wireless transmission system 10 of the present disclosure can automatically establish a wireless connection between the computer 130 and the mobile electronic device 110 and complete transmission of the data or screen information when the mobile electronic device 110 is disposed on the docking station 150 connected to the computer 130.

Although the above-described components are depicted in the drawings of the present disclosure, it cannot be excluded that more other additional elements may be used to achieve better technical effects without departing from the spirit of the present disclosure. Although the present disclosure is described with the above embodiments, it should be noted that these descriptions are not intended to limit the present disclosure. It will be apparent to those skilled in the art that various modifications and variations can be made without departing from the spirit of the present disclosure.

What is claimed is:

1. A wireless transmission system, comprising:
a mobile electronic device having first screen information;
a computer having second screen information; and
a docking station coupled to the computer, and transmitting an electrical signal to the mobile electronic device when accommodating the mobile electronic device;
wherein the computer confirms that the mobile electronic device is located on the docking station if the computer determines that a received signal strength indication (RSSI) of a Bluetooth Low Energy signal sent by the mobile electronic device is less than a preset threshold; afterward, the computer transmits Wi-Fi service set identification information to the mobile electronic device through a Bluetooth Low Energy protocol; the computer and the mobile electronic device are connected to the same Wi-Fi access point after the mobile electronic device receives the Wi-Fi service set identification information, so that the mobile electronic device sends the first screen information back to the computer.

2. The wireless transmission system according to claim 1, wherein the mobile electronic device further comprises a display coupled to the docking station and displaying the second screen information and the first screen information located on the second screen information.

3. The wireless transmission system according to claim 1, wherein the computer displays the first screen information and the second screen information; and when a file located on the second screen information is moved to a coordinate position on the first screen information, and the computer recognizes that the file moves from a coordinate position of the second screen information to the coordinate position of the first screen information, the computer transmits the file to the mobile electronic device through a file transmission program.

4. The wireless transmission system according to claim 1, wherein the computer displays the first screen information and the second screen information; and when a file located on the first screen information is moved to a coordinate position on the second screen information, the mobile electronic device transmits the file to the computer through a file transmission program.

5. The wireless transmission system according to claim 1, wherein the mobile electronic device further comprises a camera and a first application program; the first application program is located on the first screen information for reading preview data collected by the camera, and transmitting the preview data to the computer; and the computer further comprises a second application program for displaying the preview data.

6. A wireless transmission method, suitable for transmitting data between a computer and a mobile electronic device through a docking station, the wireless transmission method comprising the following steps:
detecting, by the docking station, a Bluetooth Low Energy signal sent by the mobile electronic device;
confirming, by the computer, that the mobile electronic device is located on the docking station if the computer determines that a received signal strength indication (RSSI) of a Bluetooth Low Energy signal sent by the mobile electronic device is less than a preset threshold;
transmitting, by the computer, Wi-Fi service set identification information to the mobile electronic device through a Bluetooth Low Energy protocol;
connecting, by the mobile electronic device, to a Wi-Fi access point that the computer logs in to, after receiving the Wi-Fi service set identification information; and
sending, by the mobile electronic device, first screen information displayed by itself back to the computer based on the computer and the mobile electronic device being connected to the same Wi-Fi access point.

7. The wireless transmission method according to claim 6, wherein the computer displays second screen information and the first screen information located on the second screen information.

8. The wireless transmission method according to claim 7, wherein when the computer recognizes that a file moves from a coordinate position of the second screen information to a coordinate position of the first screen information, the computer transmits the file to the mobile electronic device through a file transmission program.

9. The wireless transmission method according to claim 7, wherein when the computer recognizes that a file moves from a coordinate position of the first screen information to a coordinate position of the second screen information, the mobile electronic device transmits the file to the computer through a file transmission program.

10. The wireless transmission method according to claim 7, wherein the mobile electronic device reads preview data collected from a camera thereof, and transmits the preview data to the computer; and the computer displays the preview data on the second screen information.

\* \* \* \* \*